H. L. EVANS AND J. W. ANDREWS.
RECEPTACLE FILLING MACHINE.
APPLICATION FILED AUG. 1, 1921.

1,437,410.

Patented Dec. 5, 1922.
4 SHEETS—SHEET 1.

INVENTORS,
Harry L. Evans &
BY Jesse Watson Andrews,
Frantzel and Richards
ATTORNEYS.

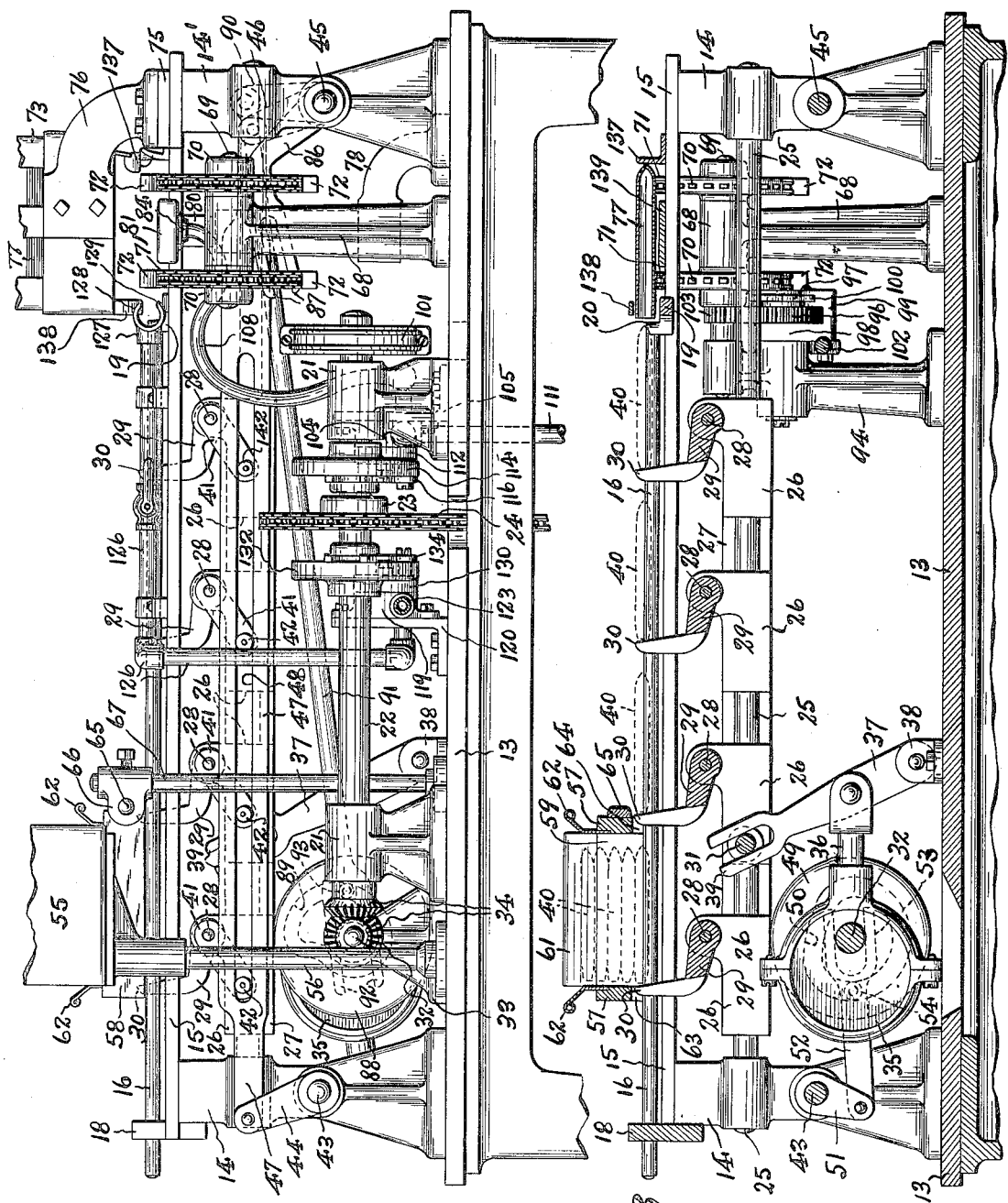

H. L. EVANS AND J. W. ANDREWS.
RECEPTACLE FILLING MACHINE.
APPLICATION FILED AUG. 1, 1921.

1,437,410.

Patented Dec. 5, 1922.

INVENTORS,
Harry L. Evans &
BY Jesse Watson Andrews,
Frantz and Richards
ATTORNEYS.

Patented Dec. 5, 1922.

1,437,410

UNITED STATES PATENT OFFICE.

HARRY L. EVANS AND JESSE WATSON ANDREWS, OF NEWPORT, RHODE ISLAND, ASSIGNORS TO CARTONING MACHINERY CORPORATION, OF NEWARK, NEW JERSEY, A CORPORATION OF NEW JERSEY.

RECEPTACLE-FILLING MACHINE.

Application filed August 1, 1921. Serial No. 488,841.

*To all whom it may concern:*

Be it known that we, HARRY L. EVANS and JESSE WATSON ANDREWS, citizens of the United States, residing at Newport, in the county of Newport and State of Rhode Island, have invented certain new and useful Improvements in Receptacle-Filling Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to machines for automatically inserting articles into paper containers, pouches, bags or the like; and the invention has reference, more particularly, to a novel construction of machine for automatically opening a container, pouch or the like, and then inserting into the same cigars, chocolate bars made in imitation of cigars, candy sticks or in fact any kind of article capable of being pushed through the opened mouth and thence into the interior of a pouch, bag or other desired form of container or pre-formed enveloping covering suitable to receive the same.

The invention has for its principal object to provide an automatic machine for successively feeding, opening and positioning pouches or bags ready to receive the content therefor, and for successively feeding to and inserting the articles for said content into said pouches or bags, together with means for synchronizing the movement of the pouches or bags and the articles relative to each other to assure cooperative delivery of the latter to the former at the filling point, and whereby a continuous operation of the machine may take place.

Another object of the invention is to provide a novel pneumatic means for opening the pouches or bags prior to their delivery at the filling point.

Another object of the invention is to provide a novel means for supporting and arranging articles subject to the operation of the article feeding and inserting mechanism.

Other objects of this invention, not at this time more particularly enumerated, will be clearly understood from the following detailed description of the same.

With the various objects of the invention in view, the same consists, primarily, in the novel pouching machine hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

While we have hereinafter described, and have illustrated in the accompanying drawings, an embodiment of our invention, wherein the pouches or bags are formed in detachably connected groups, and wherein the articles are fed in groups corresponding to the number of individual pouches or bags comprising such a detachably connected group, it must be understood that the invention, broadly, also embraces the feeding of single articles successively to single pouch or bag structures, and also groups of articles to a single pouch or bag structure designed to contain the same.

The invention is clearly illustrated in the accompanying drawings, in which:—

Figure 2 is a side elevation of the same; and Figure 3 is a longitudinal vertical section through the same, taken on line 3—3 in said Figure 1.

Figure 9 is an end view of the same after they have been opened ready for filling.

Figure 1:
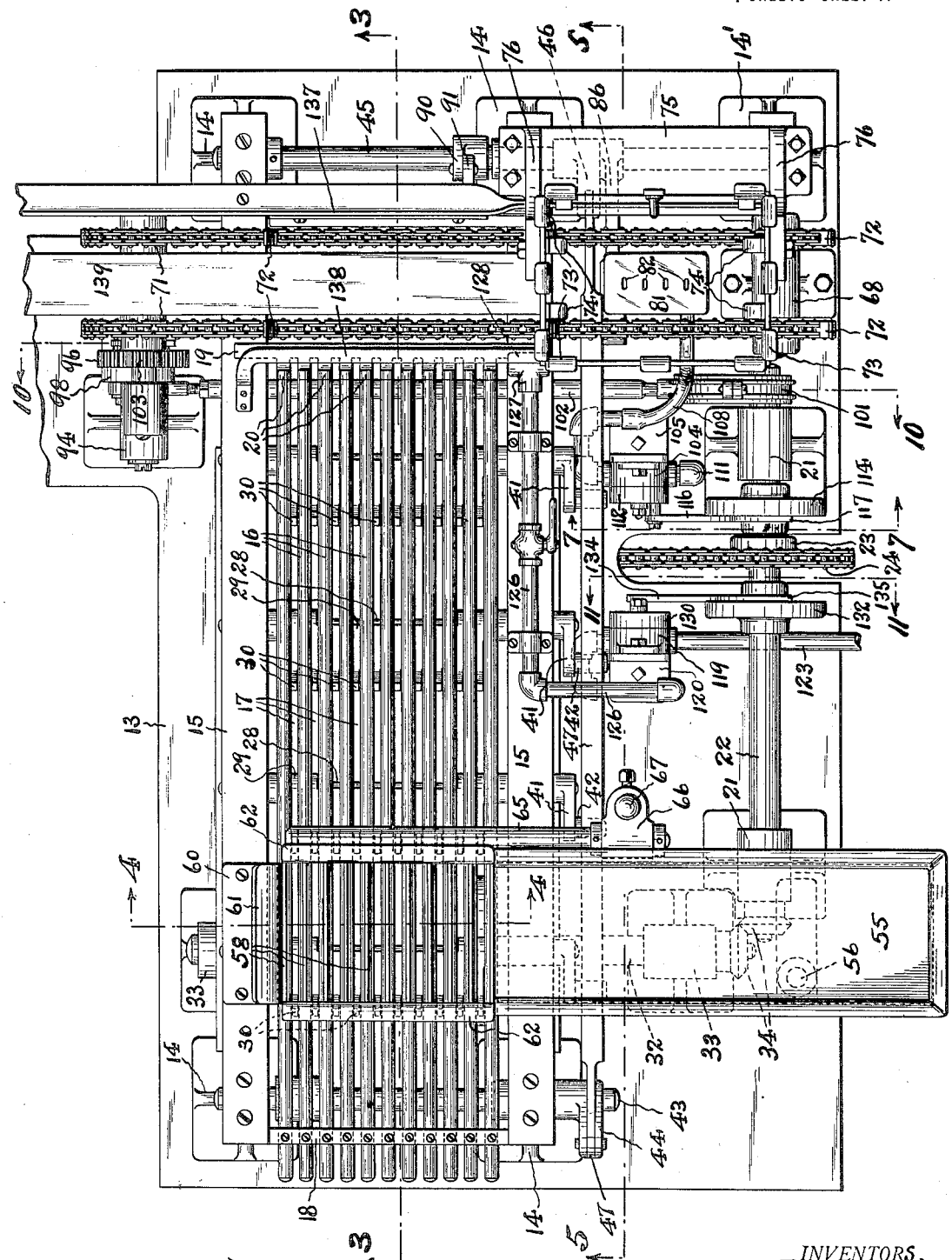
Figure 1 is a plan view of the novel pouching machine, made according to and embodying the principles of this invention.
Figure 10:
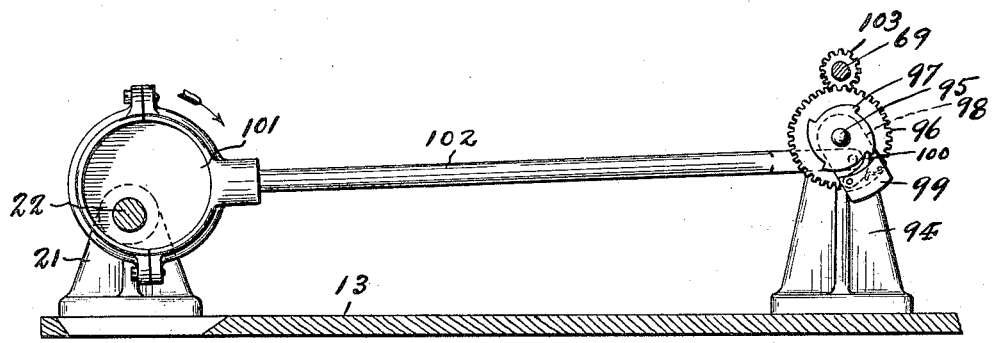

Figure 10 is a detail transverse section, taken on line 10—10 in said Figure 1, and illustrating the means for producing intermittent operative movement of the pouch feeding and positioning means.

Figure 11:
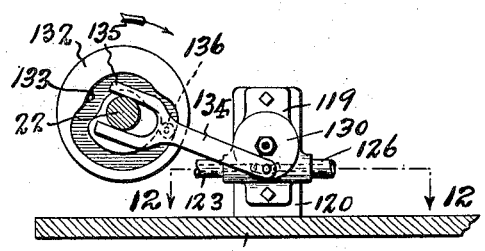
Figure 12:
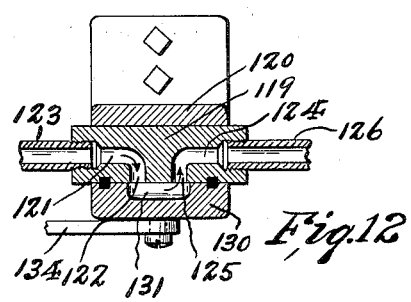

Figure 11 is a detail transverse section, taken on line 11—11 in said Figure 1 illustrating a valve mechanism controlling the operation of the pneumatic pouch opening means; and Figure 12 is a horizontal section, taken on line 12—12 in said Figure 11, and drawn on an enlarged scale.

Similar characters of reference are employed in all of the hereinabove described views, to indicate corresponding parts.

Referring now to the drawings, the reference character 13 indicates a suitably supported base or bed, upon which the mechanisms making up the novel pouching machine are mounted. Fixed upon said base or bed 13 are standards 14, upon which are supported a pair of laterally spaced parallel longitudinal bars or girders 15. Disposed between said bars or girders 15 are a plurality of longitudinal parallel guide rails 16, suitably separated by spaces 17, so that each pair of adjacent rails provides an article supporting runway. Said rails are supported at their rear ends by an anchor bar 18 fixed to and extending between the rearward laterally opposite standards 14, and at their forward ends by another anchor bar 19 fixed to and extending between said girders; said latter anchor bar 19 having laterally spaced lugs 20 to which the forward ends of said rails 16 are attached.

Fixed on said base or bed 13 at one side thereof is a pair of longitudinally alined bearings 21, in which is journaled the main driving shaft 22 of the machine. Fixed upon said driving shaft 22 is a sprocket 23 over which runs a chain 24, adapted to be driven from any suitable power source, whereby said main shaft 22 is rotated.

Fixed to and extending between each pair of longitudinally opposite standards 14, so as to be spaced beneath said girders 15, are longitudinal guide rods 25. Slidable upon said guide rods 25 are slide blocks 26. The slide blocks 26 of each guide rod are equally spaced apart longitudinally, and are tied together for movement in unison by tie-plates 27 suitably secured thereto. Journaled in each pair of laterally opposed slide blocks 26, so as to extend therebetween, is a shaft 28. Fixed on each shaft 28 is a propeller member 29, having at its free end a plurality of upwardly projecting push-fingers 30, which, when in operative position project upwardly through the spaces 17 between said guide rails 16 for forward movement relative to the runways provided by the latter. Fixed to extend between a selected pair of laterally opposed slide blocks 26 is a transverse bar 31. The devices thus described form, in part, an article feeding and inserting means adapted to be reciprocated upon said guide rods 25. The means for imparting a reciprocating movement thereto, comprises a laterally disposed shaft 32 journaled in laterally opposed bearings 33 mounted on said base or bed 13, said shaft being driven by bevel gearing 34 arranged between the same and said driving shaft 22. Mounted upon and operated by said shaft 32 is an eccentric member 35, the arm 36 of which is pivotally connected with a lever member 37, in turn pivotally connected by its lower end to a fulcrum piece 38 fixed on said base or bed 13. The upper free end of said lever member 37 possesses a bifurcated portion 39 which straddles said transverse bar 31, whereby the oscillations transmitted to said lever member by said eccentric member are converted into reciprocatory movements of said article feeding and inserting means.

The article feeding and inserting means is adapted to intermittently feed forward in each runway a plurality or train of articles, such as cigars or similar objects. The longitudinally spaced push-fingers 30 serving each runway, respectively engage the rear ends of the longitudinally spaced articles 40 therein, and upon their operative stroke propel said articles part way along said runway. The push-fingers 30 are then retracted, while depressed to pass beneath the articles immediately in the rear of the first engaged articles, so that upon initiation of the succeeding operative stroke, each push finger will engage the succeeding rearward article to feed the same further along the runway, all in such manner that an intermittent progressive movement or advance of said articles is produced. At each operative stroke of the feeding and inserting means, the group of articles at the forward or discharge end of the run-ways are pushed into pouches or bags positioned to receive the same (as will be subsequently more fully explained), while a new group of articles is introduced upon the rearward end of the runways and started forward therein, all of which will be clearly understood from an inspection, more especially, of Figures 3, 5 and 6 of the drawings.

Figure 5:
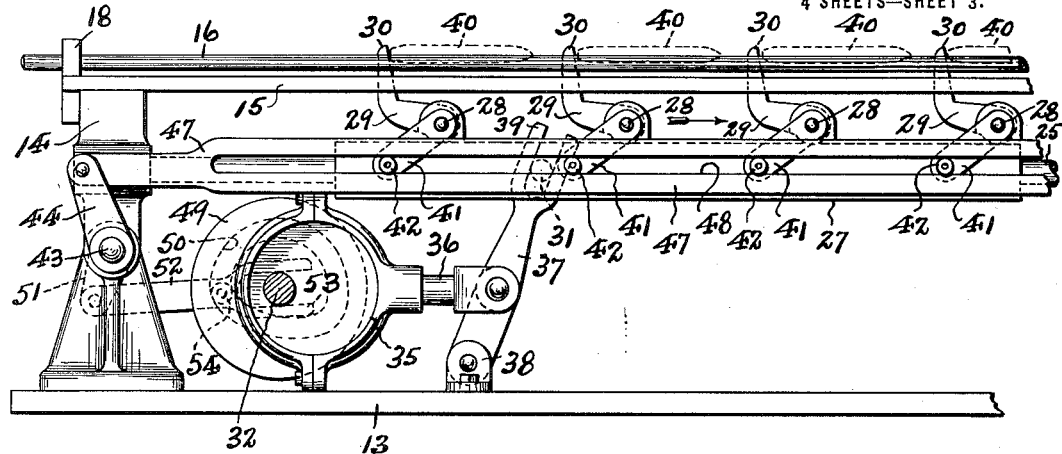
Figure 5 is a detail fragmentary vertical longitudinal section, taken on line 5—5 in Figure 1, and illustrating the operative stroke of the article feeding and inserting mechanism.
Figure 6:
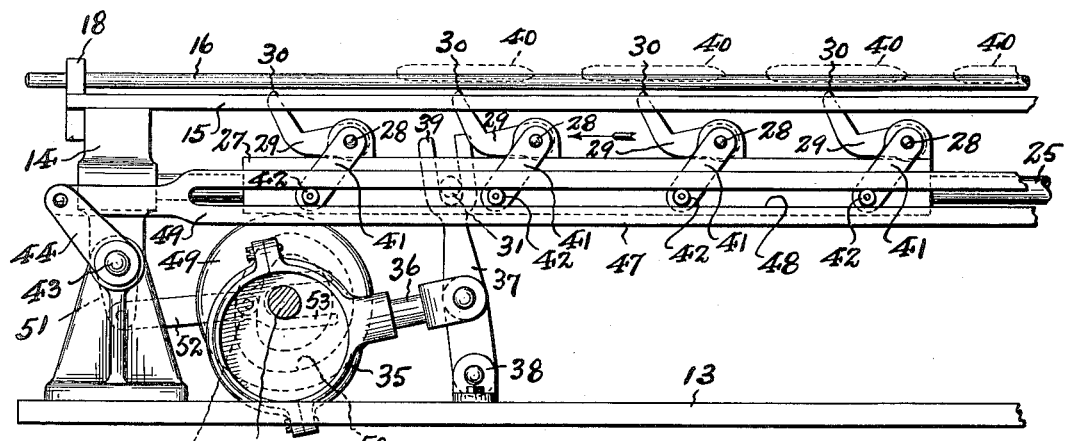
Figure 6 is a similar view illustrating the retractive stroke of said article feeding and inserting mechanism.
Figure 4:
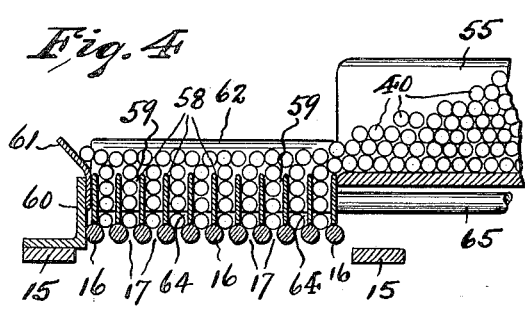
Figure 4 is a fragmentary vertical cross section, taken on line 4—4 in said Figure 1.
Figure 8:
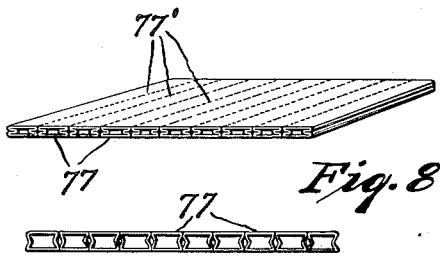
Figure 8 is a perspective view of a group of detachably connected pouches or bags in initial closed or flat condition.

The means for depressing the push-fingers 30, during their retractive stroke, comprises a crank arm 41 fixed on an exterior end of each shaft 28, at the free end of which is mounted a laterally and outwardly projecting anti-friction roller 42. Journaled in said rearward laterally opposed standards 14 is a transverse rock-shaft 43, fixed upon one end of which is an upwardly extending oscillating member 44. Journaled in the forward laterally opposed standards 14 is a transverse rock-shaft 45, and loosely pivoted upon said rock-shaft 45 is a similar oscillating member 46 longitudinally opposed to said first mentioned oscillating member 44. Pivotally connected by its respective ends to the respective free ends of said oscillating members 44 and 46, and so as to extend longitudinally and horizontally therebetween is depresser bar 47 provided with a longitudinally extending slot or guideway 48 in which said anti-friction rollers 42 of said crank arms 41 are engaged. The timed means for rocking said rock-shaft 43 to oscillate said member 44 comprises a cam-member 49 which is fixed on said shaft 32, and which is provided in its face with a suitably shaped cam-groove 50. Secured to said rock-shaft 43 is a lever 51, to the free end of which is pivotally connected a connecting rod 52 having at its free end a bifurcated or forked portion 53 which straddles said shaft 32 so as to guide the reciprocating movements of said connecting rod. Secured upon said connecting-rod 52 is a laterally projecting anti-friction roller 54 which is engaged in said cam-groove 50, so that rotation of the cam-member imparts a properly timed movement to the connecting rod for rocking the rock-shaft 43. Normally the oscillating member 44 occupies a raised position, as shown in Figures 2 and 5, thereby holding the depresser bar 47 in normally raised position or plane. When thus raised the guide slot 48 of the depresser bar holds the crank-arms 41 of the propeller members 29 raised, so that the latter are upturned to project the push-fingers 30 into operative position to engage the articles in the runways, which position is maintained thereby during the forward or operative stroke of the propeller members 29. When the propeller members 29 reach the end of their operative stroke, the cam-member 49 operates to rock the rock-shaft 43 so as to depress the oscillating member 44, thereby depressing or lowering the depresser bar 47 to a lower plane, as shown in Figure 6. This operation produces a downward swinging movement of said crank-arms 41, which in turn swings downward the propeller members 29, and depresses the push-fingers 30 so that the same pass beneath the articles in said runways during the retractive stroke of said propeller members 29, see Figure 6. At the end of the retractive stroke of the propeller members the same are again upturned to raise the fingers 30 to operative position and the cycle of the above described operations is repeated. Since the oscillating member 46 is loosely pivoted on the shaft 45, it follows the movement imparted to the oscillating member 44 thereby always supporting the depresser bar in horizontal plane.

The novel means for supplying the articles to the runways and arranging the same subject the above described operation of the article feeding and inserting mechanism, comprises a hopper or feed box 55, suitably supported upon a standard 56 which is fixed upon the base or bed 13. The open end or mouth of said hopper or feed box 55 is positioned at one side of the runways and elevated somewhat above the level of the latter. The articles 40 are piled crosswise in the hopper or feed box 55 so that the same may be rolled out of the mouth of the hopper by the operator so as to drop into the pockets of a stacker device alined with the hopper, and arranged in operative relation to the runways. The said stacker device comprises a frame consisting of transverse end plates 57 and longitudinal partition plates 58 so spaced and arranged as to provide a compartment or pocket 59 above each runway. Secured to the girder 15 on opposite side of the runways from said hopper or feed box, is a bracket 60 to which is secured a guard or stop-plate 61. Secured to the upper margin of each end plate 57 is a transverse outwardly flared guard-plate 62. The bottom edge of the rearward end plate 57 is spaced above the runways for a sufficient distance to provide a clearance space or passage 63 for the push-fingers 30 to enter and move longitudinally through the bottoms of the pockets 59. In like manner the bottom edge of the forward end plate 57 is spaced above the runways for a sufficient distance to provide an escape passage 64 which will permit the push-fingers 30 to propel the lowermost article 40 in each pocket 59 endwise and outwardly therefrom along the runways, while holding back all articles piled above said lowermost article within the pockets or compartments 59. By this arrangement the operator sweeps outwardly from the hopper 55 a bunch or plurality of the articles 40 over the upper open ends of the pockets or compartments 59, so that the said articles fall into the latter and pile themselves one upon the other within each pocket, so that as the lowermost article is removed from each pocket the articles above successively drop downward upon the runways ready to receive the propulsive impulse of the push-fingers 30. In order to render the frame by which the pockets 59 are provided removable from normal operative position, so that the same may be raised from the runways in the event any jamming or congestion of the articles occurs rendering it necessary to clear the pockets or the runways, the said frame is fixed to a transverse bar or shaft 65, which has its free end rotatably arranged in a bearing 66 mounted on a supporting standard 67. By means of this arrangement the frame is pivoted or hinged so that when desired the same may be swung upwardly out of its normal operative position.

Fixed upon said base or bed 13, at the forward end thereof, are a pair of laterally opposed bearing standards 68, in each of which are journaled the shafts 69 of pairs of sprocket wheels 70 over which run a pair of parallel conveyer chains 71 having suitably spaced conveyer lugs 72 connected therewith. Said conveyer chains 71 are so disposed that their upper levels are in substantial alinement with the plane of said article runways, and so that the same move transversely at the discharge or forward ends of said runways. Disposed above the forward end of said conveyer chains 71 is a magazine 73 comprising a frame-work open at its lower end, and provided at said lower end with supporting lugs 74. Mounted on said base or bed 13 is a standard 14' providing an additional bearing for said rock-shaft 45. Secured upon said standard 14' and the adjacent standard 14 is a plate 75 upon which are secured brackets 76 to which said magazine 73 is attached and by which the same is supported. Said magazine 73 is adapted to hold a stack or pile of containers in their initial flat or collapsed condition, said containers each comprising, in the case illustrated in the drawings, a plurality of paper pouches 77 normally connected together; but each pouch being separated from its adjacent fellows by a parting line of perforations 77' whereby, when desired the pouches may be torn apart one from the other. When placed in the magazine 73 the pile of flat or collapsed pouch containers rest upon the supporting lugs 74 in such a manner that the bottom or lowermost container may be downwardly withdrawn and pulled away from the supporting lugs 74, and thus released from the pile or stack and from the magazine.

The means for releasing the bottom or lowermost container comprises a vertically reciprocated pneumatic pouch puller mechanism, consisting of a bracket 78 fixed upon said base or bed 13, and provided with a vertical guideway 79. Movable in said guideway is a slide-member 80, to the upper end of which is attached a suction plate 81, which possesses in its upper surface a plurality of suction mouths 82 connected with a suction passage or duct 83 which communicates with an outlet nipple 84. Mounted upon said slide-member 80 is a laterally projecting anti-friction roller 85. The means for vertically reciprocating said pneumatic pouch puller comprises a lever 86 fixed on said rock-shaft 45, so as to be oscillated thereby, said lever having at its free end a fork or bifurcated portion 87 which straddles said anti-friction roller 85. The means for rocking said rock-shaft 45 comprises a cam-member 88 fixed on said shaft 32, said cam-member having in its face a suitably formed or shaped cam-groove 89. Fixed on said rock-shaft is a lever arm 90, to the free end of which is pivotally connected one end of a connecting rod 91. The opposite end of said connecting rod is provided with a bifurcated, or forked portion 92 which straddles said shaft 32, whereby the movement of said connecting rod is properly guided. Arranged on said connecting rod is a laterally projecting anti-friction roller 93 which enters and rides in said cam-groove 89. The rotation of said cam-member 88 and its cam-groove 89 produces a reciprocation of said connecting rod, which is transmitted to said lever arm 90 to thereby rock said rock-shaft 45, and in turn oscillate said lever 86 to produce a properly timed upward and downward movement of said suction plate 81.

The said conveyer chains 71 are operated to produce an intermittent progressive movement whereby after a pouch container is released from the magazine 73 and deposited upon the conveyer chains, it is moved by the latter to the filling position at the forward end of the runways, and then stopped in such position to hold the same stationary while the article feeding and inserting mechanism operates to insert the desired articles therein. This intermittent movement of said conveyer chains is accomplished in the following manner. Mounted on said base or bed 13 adjacent to the rearward end of said conveyer chains, is a bearing standard 94 provided with a journal stud 95. Rotatably arranged upon said journal stud 95 is a gear wheel 96, to the outer face of which is fixed a ratchet member 97. Pivoted upon said journal stud 95 is an oscillatable member 98 which is provided with a lateral extension 99 extending beneath said gear wheel 96. Pivotally mounted on said extension 99 is a spring pressed dog 100 which operatively engages said ratchet member 97. Fixed on said driving shaft 22 is an eccentric member 101, the connecting arm 102 of which is pivotally attached to said oscillatable member 98. Said eccentric member 101 produces an oscillation of oscillatable member 98 whereby the dog 100 actuates a step by step rotation of said ratchet member 97, which in turn causes an intermittent rotation of said gear wheel 96. Fixed on the end of the shafts 69 of the rearward sprocket wheels 70 is a spur gear 103 which meshes with and is driven by said gear wheel 96, thereby serving to intermittently rotate said rearward sprocket wheels 70, so that thereby the proper movement of the conveyer chains 71 with intermittent stop thereof is produced.

While the conveyer chains 71 are in stopped position, the pneumatic pouch puller is timed to operate, so that the suction plate 81 is raised to engage with the under surface of the lowermost pouch container in the magazine 73. As soon as the suction plate 81 is thus engaged with said pouch container, an automatic valve mechanism operates to connect the same with an exhaust or suction pump (not shown) to produce a suction effect at said suction mouths 82 whereby the said pouch container is caused to adhere to said suction plate. This valve mechanism consists of a valve body 104 which is suitably secured upon a supporting bracket 105 fixed to said base or bed 13. Said valve body 104 is provided with an inlet passage 106 terminating in an inlet port 107 provided in the face of said valve body. Said inlet passage 106 is connected in communication with said suction passage or duct 83 by means of a flexible hose member 108. Said valve body 104 is further provided with an outlet passage 109 having at its inner end an outlet port 110 terminating in the face of said valve body. Said outlet passage 109 is connected by piping 111 with the exhaust or suction pump. Centrally pivoted upon said valve body 104, so as to extend over and register with the face of the same, is a movable valve plate 112 having in its inner face a by-pass port 113. Mounted on said driving shaft 22 is a cam-member 114 having in its face a suitably shaped cam groove 115. Pivotally connected with said valve plate 112 is a connecting rod 116 having at its outer end a bifurcated or forked portion 117 which straddles said shaft 22. Said connecting rod 116 is provided with a laterally projecting anti-friction roller 118, which enters and rides in said cam-groove. Said cam-groove is so shaped that, when the cam member 114 is rotated, the operation of the above described valve mechanism is properly timed relative to the movements of the suction plate 81, whereby as the latter is raised and contacts with the lowermost pouch container in the magazine 73, the valve plate is shifted to position the by-pass port 113 in intercommunicating relation to the outlet and inlet ports 110 and 107, so that air is exhausted through the valve from the suction plate 81 by action of the exhaust pump, thereby causing said pouch container to adhere to the suction plate. The suction effect of the suction plate 81 is maintained while the same is lowered by the pouch puller operating mechanism above described, so that the said lowermost pouch container is pulled downwardly away from the magazine 73, and carried on to the conveyer chains 71. After being thus delivered to the conveyer chains 71, the pouch container is released from the suction plate, by the timed reverse operation of the valve mechanism as controlled by the cam-groove of the cam-member 114, whereby the valve-plate 112 is timed to move the by-pass port 113 out of intercommunicating relation to the outlet and inlet ports 110 and 107, so that communication between the exhaust pump and the suction plate 81 is cut off or interrupted.

Figure 9:
Figure 7:
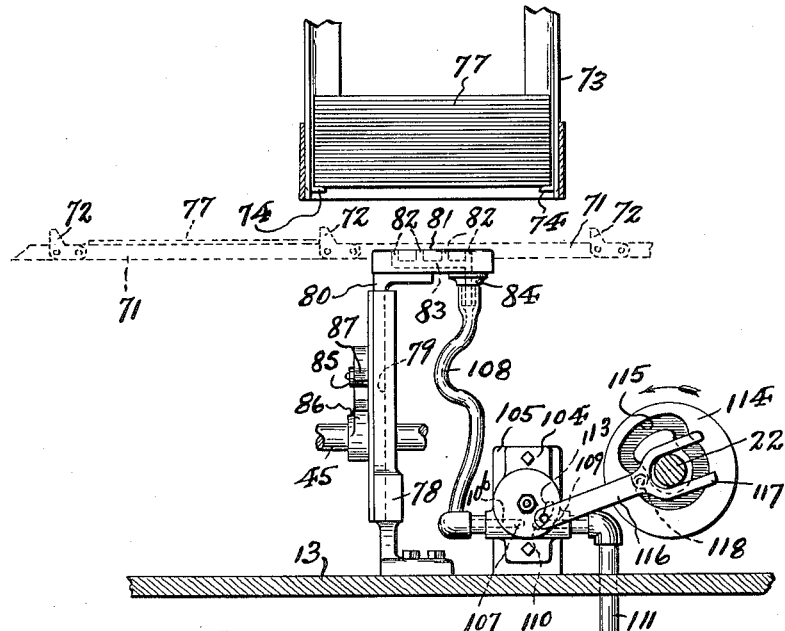
Figure 7 is a detail transverse section, taken on line 7—7 in said Figure 1, illustrating the pneumatic means for removing pouches or bags from a stack or supply subject to the pouch feeding and positioning means.

By the time a pouch container is thus delivered on to the conveyer chains 71, the operating mechanism of the latter is timed to move the same, so that the conveyer lugs 72 engage and push the said pouch container toward the filling point at forward ends of the runways. It is necessary, however, that the pouch container, which is flat or collapsed when delivered on to the conveyer chains, should be opened, before reaching the filling point, so as to expand the mouths of the pouches thereof ready to receive the articles 40. This operation is accomplished by a pneumatic means, which controls and operates a stream of air under pressure. This pneumatic means consists of a control valve mechanism, comprising a valve body 119 which is suitably secured upon a supporting bracket 120 fixed to said base or bed 13. Said valve body 19 is provided with an inlet passage 121 terminating in an inlet port 122 provided in the face of said valve body 119. Said inlet passage 121 is connected by piping 123 with a suitable source of compressed air (not shown). Said valve body 119 is further provided with an outlet passage 124 having at its inner end an outlet port 125 terminating in the face of said valve body. Said outlet passage is connected by piping 126 with a suitable nozzle device 127, having a mouth portion formed by upper and lower transverse lips 128 and 129 respectively. Said nozzle device is so situated, that as the chains 71 propel the pouch container toward the filling point, the openable ends of the pouches successively pass between the lips 128 and 129, so that a stream of air ejected from the nozzle will inflate the pouches, and cause the same to open up so that their mouths are expanded as shown in Figure 9. Centrally pivoted upon said valve body 119, so as to extend over and register with the face of the same, is a movable valve plate 130 having in its inner face a by-pass port 131. Mounted on said driving shaft 22 is another cam-member 132 having in its face a suitably shaped cam-groove 133. Pivotally connected with said valve plate 130 is a connecting rod 134 having at its outer end a bifurcated or forked portion 135 which straddles said shaft 22. Said connecting rod 134 is provided with a laterally projecting anti-fricition roller 136, which enters and rides in said cam-groove. Said cam-groove is so shaped that, as the pouch container enters between said nozzle lips, the valve plate 130 is shifted to position the by-pass port 131 in inter-communicating relation to the inlet and outlet ports 122 and 125, so that a stream of air is passed through the valve mechanism to the nozzle device so as to blow open the pouches as the same are moved past the said nozzle device. As soon as the last pouch or pocket of the container passes the nozzle device, the cam-member 132 operates to reverse the movement of said valve plate 130 to move the by-pass port 131 out of intercommunicating relation to said inlet and outlet ports 122 and 125, so that communication between the source of compressed air and said nozzle device is interrupted.

The reference character 137 indicates a fixed stop or guard flange which parallels said conveyer chains 71, on the outer side of the latter, and which serves to back the pouch container against displacement from the conveyer chains while the articles are being inserted therein, as well as to hold the article filled container against displacement as it is conveyed away from the filling point. The reference character 138 indicates a horizontal guard plate which extends from the magazine 73 transversely intermediate the ends of the runways and the conveyer chains 71, in such upwardly spaced position that the open ends of the pouch container pass beneath the same so as to hold the same against upward displacement, both when subjected to the air stream from the nozzle device and when subjected to the filling operation.

Disposed between the conveyer chains 71 is a plate 139, which prevents sagging of the pouch container, and which also receives the filled pouch containers as they are discharged from the conveyer chains.

As will be understood the intermittent movement of the conveyer chains is so arranged for as to distance of travel and timing, that a pouch container is carried, after having been released from the magazine 73, onward past the nozzle device 127 to the filling point, that is to a point where the individual pockets or pouches of the container are respectively alined with the ends of the respective article runways, and there stopped. The article feeding and inserting mechanism is so timed that the moment the pouch container is properly alined and stopped opposite the discharge ends of the article runways, the said mechanism will begin its propelling movement whereby the articles 40 are pushed out of the discharge ends of the runways and into the opened mouths of the pouches or pockets of the container, whereupon the push-fingers 30 make their retractive stroke, and the conveyer chain resumes its motion to convey away the filled container, and deposit a new container in position to be filled. This cycle of operations may be continued indefinitely so that the machine operates in a continuous manner.

From the above description of the construction, the whole will be clearly understood without necessity for further recapitulation. It will also be understood, that various changes may be made in the arrangement and details and form of the parts, whereby the principles of the machine may be adapted to the character of the article or character of the container to be operated upon. We do not desire, therefore, to be confined to the particular form of the invention herein shown and described, but aim to cover in the claims all modifications which do not involve a departure from the spirit and scope of the invention.

We claim :—

1. A machine of the kind described, comprising an article runway, a conveyer movable transversely of the discharge end of said article runway, means for successively transferring containers from a source of supply and depositing the same upon said conveyer, means for intermittently driving said conveyer whereby the containers are successively stopped at the discharge end of said runway, and means cooperating with said runway for feeding articles therethrough and finally inserting the same into the stopped containers.

2. A machine of the kind described, comprising an article runway, a conveyer movable transversely of the discharge end of said runway, means for successively depositing containers upon said conveyer, means for intermittently driving said conveyer whereby the containers are successively stopped at the dischage end of said runway, pneumatic means for opening said containers ready for filling as the same are moved to the discharge end of said runway, and means cooperating with said runway for feeding articles therethrough and finally inserting the same into the stopped containers.

3. A machine of the kind described, comprising an article runway, means for successively feeding pouch-like containers into registration with the discharge end of said runway, pneumatic means for blowing open the said containers to expand the mouths of the same as they move to stopped position relative to said runway, and article propelling means cooperating with said runway to cause a progresssive step by step movement of articles therethrough and operating to finally push the articles into the containers.

4. A machine of the kind described, comprising an article runway, means for successively feeding pouch-like containers into registration with the discharge end of said runway, pneumatic means for blowing open the said containers to expand the mouths of the same as they move to stopped position relative to said runway, article propelling means cooperating with said runway to cause a progressive step by step movement of articles therethrough and operating to finally push the articles into the containers, and means for stacking articles at the rearward end of said runway subject to the operation of said propelling means.

5. A machine of the kind described, comprising an article runway, means for successively feeding containers into registration with the discharge end of said runway, an air nozzle past which the containers are fed toward said discharge end of said runway, means for delivering air under pressure to said nozzle, a valve means cooperating with said air delivery means, automatic means for timing the opening and closing of said valve means, and article propelling means cooperating with said runway to cause a progressive step by step movement of articles therethrough and operating to finally push articles into the containers.

6. A machine of the kind described, comprising an article runway, a conveyer movable transversely of the discharge end of said article runway, a magazine for holding a stack of containers spaced above the receiving end of said conveyer, said magazine having an open bottom provided with supporting lugs for retaining said stack of containers therein, said containers being successively removable from the bottom of said magazine, means for successively transferring said containers from said magazine to said conveyer, means for intermittently driving said conveyer whereby the containers are successively stopped at the discharge end of said runway, and means cooperating with said runway for feeding articles therethrough and finally inserting the same into the stopped containers.

7. A machine of the kind described, comprising an article runway, a conveyer movable transversely of the discharge end of said article runway, a magazine for holding a stack of containers spaced above the receiving end of said conveyer, said magazine having an open bottom provided with supporting lugs for retaining said stack of containers therein, said containers being successively removable from the bottom of said magazine, a vertically reciprocable suction plate beneath said magazine, means producing timed reciprocations of said suction plate whereby said containers are successively transferred from said magazine to said conveyer, a suction conduit connected with said suction plate, a valve means cooperating with said suction conduit, automatic means for timing the opening and closing of said valve means, means for intermittently driving said conveyer whereby the containers are successively stopped at the discharge end of said runway, and means cooperating with said runway for feeding articles therethrough and finally inserting the same into the stopped containers.

8. A machine of the kind described, comprising an article runway, a conveyer removable transversely of the discharge end of said runway, a magazine for holding a stack of collapsed containers spaced above the receiving end of said conveyer, said magazine having an open bottom provided with supporting lugs for retaining said stack of containers therein, said containers being successively removable from the bottom of said magazine, means for successively transferring said containers from said magazine to said conveyer, means for intermittently driving said conveyer whereby the containers are successively stopped at the discharge end of said runway pneumatic means intermediate said magazine and said runway past which said containers are moved and by which the same are blown open to expand the mouths of the same prior to arrival in stopped relation to said runway, and means cooperating with said runway for feeding articles therethrough and finally inserting the same into the stopped containers.

9. A machine of the kind described, comprising an article runway, a conveyer movable transversely of the discharge end of said runway, a magazine for holding a stack of collapsed containers spaced above the receiving end of said conveyer, said magazine having an open bottom provided with supporting lugs for retaining said stack of containers therein, said containers being successively removable from the bottom of said magazine, means for successively transferring said containers from said magazine to said conveyer, means for intermittently driving said conveyer whereby the containers are successively stopped at the discharge end of said runway, an air nozzle past which the collapsed containers are moved toward the discharge end of said runway, means for delivering air under pressure to said nozzle, a valve means cooperating with said air delivery means, automatic means for timing the opening and closing of said valve means, and means cooperating with said runway for feeding articles therethrough and finally inserting the same into the stopped containers.

10. A machine of the kind described, comprising an article runway, a conveyer movable transversely of the discharge end of said runway, a magazine for holding a stack of collapsed containers spaced above the receiving end of said conveyer, said magazine having an open bottom provided with supporting lugs for retaining said stack of containers therein, said containers being successively removable from the bottom of said magazine, a vertically reciprocable suction plate beneath said magazine, means producing timed reciprocations of said suction plate whereby said containers are successively transferred from said magazine to said conveyer, a suction conduit connected with said suction plate, a cut-off valve cooperating with said suction conduit, automatic means for timing the opening and closing of said cut-off valve, means for intermittently driving said conveyer whereby the containers are successively stopped at the discharge end of said runway, pneumatic means intermediate said magazine and said runway past which said containers are moved and by which the same are blown open to expand the mouths of the same prior to arrival in stopped relation to said runway, and means co-operating with said runway for feeding articles therethrough and finally inserting the same into the stopped containers.

11. A machine of the kind described, comprising an article runway, a conveyer movable transversely of the discharge end of said runway, a magazine for holding a stack of collapsed containers spaced above the receiving end of said conveyer, said magazine having an open bottom provided with supporting lugs for retaining said stack of containers therein, said containers being successively removable from the bottom of said magazine, a vertically reciprocable suction plate beneath said magazine, means producing timed reciprocations of said suction plate whereby said containers are successively transferred from said magazine to said conveyer, a suction conduit connected with said suction plate, a cut-off valve co-operating with said suction conduit, automatic means for timing the opening and closing of said cut-off valve, means for intermittently driving said conveyer whereby the containers are successively stopped at the discharge end of said runway, an air nozzle past which the collapsed containers are moved toward the discharge end of said runway, means for delivering air under pressure to said nozzle, a valve means cooperating with said air delivery means, automatic means for timing the opening and closing of said valve means, and means co-operating with said runway for feeding articles therethrough and finally inserting the same into the stopped containers.

12. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards, a plurality of longitudinally spaced slide-blocks on said guide rods, means coupling together the slide-blocks on each guide rod, propeller members pivotally carried between each pair of laterally opposed slide-blocks, each propeller member having push fingers adapted to enter and move forward through said runways, means for reciprocating said slide-blocks and propeller members, automatic means for depressing said propeller members on their retractive stroke to withdraw said push fingers from said runways to pass beneath articles supported by the latter, and means for successively feeding pouch or compartment containers into stopped registration with the discharge ends of said runways to receive articles pushed out of the latter.

13. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards, a plurality of longitudinally spaced slide-blocks on said guide rods, means coupling together the slide-blocks on each guide-rod, propeller members pivotally carried between each pair of laterally opposed slide-blocks, each propeller member having push fingers adapted to enter and move forward through said runways, means for reciprocating said slide-blocks and propeller members, automatic means for depressing said propeller members on their retractive stroke to withdraw said pushfingers from said runways to pass beneath articles supported by the latter, means for successively feeding containers into stopped registration with the discharge ends of said runways to receive articles pushed out of the latter, and means for stacking articles at the rearward end of each runway subject to operative engagement of the push fingers of the rearward propeller member.

14. In a machine of the kind described, a bed, standards on said bed, laterally spaced longitudinal girders supported on said standards, a plurality of laterally spaced longitudinal guide rails providing intermediate open article supporting runways, means fixed to said intermediate open article supporting runways, means fixed on said girders for supporting said guide rails, a pair of guide rods extending respectively between longitudinally opposed standards, a plurality of longitudinally spaced slide-blocks on said guide rods, means coupling together the slide-blocks on each guide rod, propeller members pivotally carried between each pair of laterally opposed slide-blocks, each propeller member having push fingers adapted to enter and move forward through said runways, means for reciprocating said slide-blocks and propeller members, automatic means for depressing said propeller members on their retractive stroke to withdraw said push fingers from said runways to pass beneath articles supported by the latter, means for successively feeding pouch or compartment containers into stopped registration with the discharge ends of said runways to receive articles pushed out of the latter and means for stacking articles at the rearward end of each runway subject to operative engagement of the push fingers of the rearward propeller member, comprising a frame member having longitudinal partitions to form vertical pockets above each runway, said frame member having openings permitting longitudinal outward movement of the lowermost article in each pocket, and a hopper mounted adjacent to said frame member for supplying articles to said pockets.

15. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, means for depressing said propeller members on their rearward stroke to withdraw said push fingers from said runways to pass beneath the articles supported by the latter, and means for successively feeding pouch or compartment containers into stopped registration with the discharge ends of said runways to receive the articles pushed out of the latter.

16. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, means for depressing said propeller members on their rearward stroke to withdraw said push fingers from said runways to pass beneath the articles supported by the latter, and means for successively feeding pouch or compartment containers into stopped registration with the discharge ends of said runways to receive the articles pushed out of the latter, and means for stacking articles at the rearward end of each runway subject to operative engagement of the push fingers of the rearward propeller member.

17. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, means for depressing said propeller members on their rearward stroke to withdraw said push fingers from said runways to pass beneath the articles supported by the latter, and means for successively feeding pouch or compartment containers into stopped registration with the discharge ends of said runways to receive the articles pushed out of the latter, and means for stacking articles at the rearward end of each runway subject to operative engagement of the push fingers of the rearward propeller member, comprising a frame member having longitudinal partitions to form vertical pockets above each runway, said frame member having openings permitting longitudinal outward movement of the lowermost article in each pocket, and a hopper mounted adjacent to said frame member for supplying articles to said pockets.

18. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, a crank arm connected with each propeller member, a laterally projecting anti-friction roller at the free end of each crank arm, a longitudinal depresser bar having a guide slot in which said anti-friction rollers are engaged, means producing a timed lowering movement of said depresser bar to swing downward said propeller members thereby withdrawing said push fingers from said runways during their retractive strokes to pass beneath the articles supported by the latter, and means for successively feeding pouch or compartment containers into stopped registration with the discharge ends of said runways to receive the articles pushed out of the latter.

19. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, a crank arm connected with each propeller member, a laterally projecting anti-friction roller at the free end of each crank arm, a longitudinal depresser bar having a guide slot in which said anti-friction rollers are engaged, means producing a timed lowering movement of said depresser bar to swing downward said propeller members thereby withdrawing said push fingers from said runways during their retractive strokes to pass beneath the articles supported by the latter, and means for successively feeding pouch or compartment containers into stopped registration with the discharge ends of said runways to receive the articles pushed out of the latter, and means for stacking articles at the rearward end of each runway subject to operative engagement of the push fingers of the rearward propeller member.

20. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards and beneath the level of said runways, a propeller mechanism mounted for longitudinal reciprocation on said guide rods, said propeller mechanism having a set of longitudinally spaced oscillatable propeller members provided with push-fingers adapted to enter and move forward through said runways to push articles along the latter, a crank arm connected with each propeller member, a laterally projecting anti-friction roller at the free end of each crank arm, a longitudinal depresser bar having a guide slot in which said anti-friction rollers are engaged means producing a timed lowering movement of said depresser bar to swing downward said propeller members thereby withdrawing said push fingers from said runways during their retractive strokes to pass beneath the articles supported by the latter, and means for successively feeding pouch or compartment containers into stopped registration with the discharge ends of said runways to receive the articles pushed out of the latter, and means for stacking articles at the rearward end of each runway subject to operative engagement of the push fingers of the rearward propeller member, comprising a frame member having longitudinal partitions to form vertical pockets above each runway, said frame member having openings permitting longitudinal outward movement of the lowermost article in each pocket, and a hopper mounted adjacent to said frame member for supplying articles to said pockets.

21. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway to produce a step by step movement of articles along the latter, and means for depressing said propeller members on their rearward stroke to withdraw said push fingers from said runway to pass beneath the articles supported by the latter.

22. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway to produce a step by step movement of articles along the latter, and means for depressing said propeller members on their rearward stroke to withdraw said push fingers from said runway to pass beneath the articles supported by the latter, said means comprising a crank arm connected with each propeller member, a laterally projecting anti-friction roller at the free end of each crank arm, a longitudinal depresser bar having a guide slot in which said anti-friction rollers are engaged, and means producing a timed rise and fall of said depresser bar.

23. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards, a plurality of longitudinally spaced slide blocks on said guide rods, means coupling together the slide blocks on each guide rod, propeller members pivotally carried between each pair of slide blocks, each propeller member having push fingers adapted to enter and move forward through said runways, means for reciprocating said slide blocks and propeller members, a crank arm connected with each propeller member, a laterally projecting anti-friction roller at the free end of each crank arm, a longitudinal depresser bar having a guide slot in which said anti-friction rollers are engaged, and means producing a timed rise and fall of said depresser bar.

24. In a machine of the kind described, a bed, standards on said bed, laterally spaced longitudinal girders supported on said standards, a plurality of laterally spaced longitudinal guide rails providing intermediate open article supporting runways, means fixed to said girders for supporting said guide rails, a pair of guide rods extending respectively between longitudinally opposed standards, a plurality of longitudinally spaced slide blocks on said guide rods, means coupling together the slide blocks on each guide rod, propeller members pivotally carried between each pair of slide blocks, each propeller member having push fingers adapted to enter and move forward through said runways, means for reciprocating said slide blocks and propeller members, a crank arm connected with each propeller member, a laterally projecting anti-friction roller at the free end of each crank arm, a longitudinal depresser bar having a guide slot in which said anti-friction rollers are engaged, means producing a timed rise and fall of said depresser bar, and means for successively feeding containers into stopped registration with the discharge ends of said runways to receive articles pushed out of the latter.

25. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, and means for successively feeding pouch-like containers into stopped registration with the discharge end of said runway to receive the articles pushed out of the latter.

26. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, means for successively feeding pouch-like containers into stopped registration with the discharge end of said runway to receive the articles pushed out of the latter, and pneumatic means for blowing open the said containers to expand the mouths of the same as they move to stopped position relative to said runway.

27. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, means for successively feeding pouch-like containers into stopped registration with the discharge end of said runway to receive the articles pushed out of the latter, and pneumatic means for blowing open the said containers to expand the mouths of the same as they move to stopped position relative to said runway, and means for stacking articles at the rearward end of said runway subject to operative engagement of the push finger means of the rear propeller member.

28. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runways, means for depressing said propeller members on their rearward stroke to withdraw said push fingers from said runway to pass beneath the articles supported by the latter to produce a step by step movement of the articles along said runway, a conveyer movable transversely of the discharge end of said article runway, a guard flange extending along the outer side of said conveyer, a magazine for holding a stack of containers spaced above the receiving end of said conveyer, means for successively transferring said containers from said magazine to said conveyer, and means for intermittently driving said driving conveyer whereby said containers are successively stopped at the discharge end of said runway to receive articles therefrom.

29. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, a conveyer movable transversely of the discharge end of said article runway, a guard flange extending along the outer side of said conveyer, a magazine for holding a stack of containers spaced above the receiving end of said conveyer, means for successively transferring said containers from said magazine to said conveyer, means for intermittently driving said driving conveyer whereby said containers are successively stopped at the discharge end of said runway to receive articles therefrom, an air nozzle past which the containers are moved toward the discharge end of said runway, means for delivering air under pressure to said nozzle, a valve means cooperating with said air delivery means, and automatic means for timing the opening and closing of said valve means.

30. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, a conveyer movable transversely of the discharge end of said article runway, a guard flange extending along the outer side of said conveyer, a magazine for holding a stack of containers spaced above the receiving end of said conveyer, means for successively transferring said containers from said magazine to said conveyer, means for intermittently driving said conveyer whereby said containers are successively stopped at the discharge end of said runway to receive articles therefrom, an air nozzle past which the containers are moved toward the discharge end of said runway, means for delivering air under pressure to said nozzle, a valve means cooperating with said air delivery means, automatic means for timing the opening and closing of said valve means, and means for stacking articles at the rearward end of said runway subject to operative engagement of the push finger means of the rearward propeller member.

31. In a machine of the kind described, means providing an article runway, a propeller mechanism mounted for longitudinal reciprocation beneath said runway, said propeller mechanism having a set of longitudinally spaced pivoted propeller members each having push finger means adapted to enter and move forward through said runway, means for depressing said propeller members on their rearward stroke to withdraw said push fingers from said runway to pass beneath the articles supported by the latter to produce a step by step movement of the articles along said runway, a conveyer movable transversely of the discharge end of said article runway, a guard flange extending along the outer side of said conveyer, a magazine for holding a stack of containers spaced above the receiving end of said conveyer, means for successively transferring said containers from said magazine to said conveyer, means for intermittently driving said driving conveyer whereby said containers are successively stopped at the discharge end of said runway to receive articles therefrom, and means for stacking articles at the rearward end of said runway subject to operative engagement of the push finger means of the rearward propeller member.

In testimony, that we claim the invention set forth above we have hereunto set our hands this 21st day of June, 1921.

HARRY L. EVANS.
JESSE WATSON ANDREWS.

Witnesses:
ARTHUR J. CAPPER,
LAURENCE W. CHAMPLIN.